Figures 1, 2, 3:
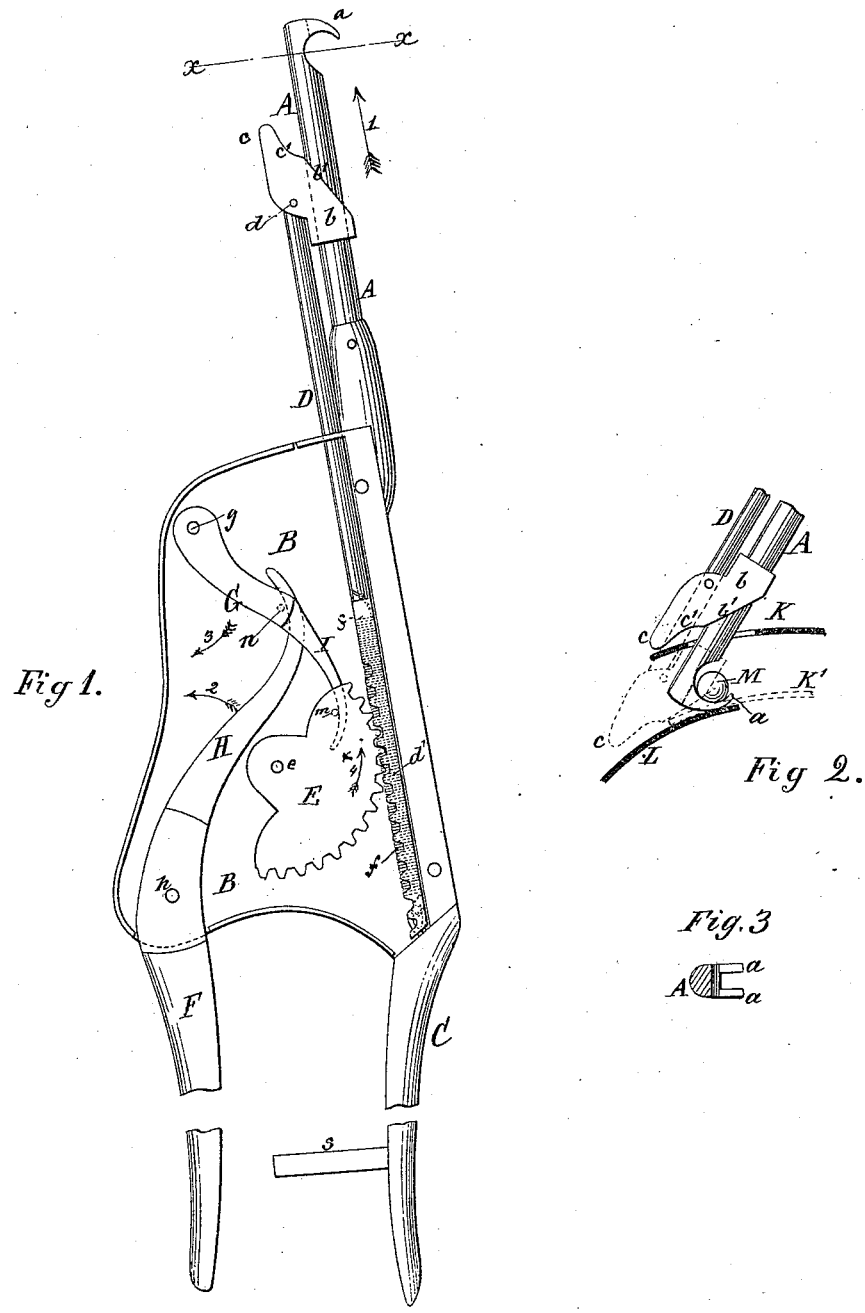

(No Model.)

G. O. RING.
BUTTON HOOK.

No. 346,608. Patented Aug. 3, 1886.

Witnesses:
F. M. Croseman
Thos. Franzin

Inventor:
G. O. Ring
by A. W. Almqvist
Attorney

UNITED STATES PATENT OFFICE.

GULDBRAND OLSEN RING, OF HORTEN, NORWAY.

BUTTON-HOOK.

SPECIFICATION forming part of Letters Patent No. 346,608, dated August 3, 1886.

Application filed March 13, 1886. Serial No. 195,062. (No model.)

*To all whom it may concern:*

Be it known that I, GULDBRAND OLSEN RING, a citizen of Norway, and a resident of Horten, in the Kingdom of Norway, have invented a new and useful Improvement in Button-Hooks, of which the following is a specification.

The object of my invention is to provide an improved implement, which shall greatly facilitate the buttoning of shoes and save the wearer the trouble of bending or stooping so much, as has to be done in order to reach with the ordinary button-hooker, which, after being hooked onto the button, must be turned over or swung with its handle in about or below a horizontal position to cause the button to be properly surrounded by the button-hole of the shoe-flap.

The invention will be hereinafter fully described, and specifically pointed out in the claims, reference being had to the accompanying drawings, in which—

Figure 1 represents a side view of my improved button-hooker with the handles broken off and the cover removed from the casing to show the gearing inside. Fig. 2 is a detail view explanatory of how the implement is used in buttoning shoes. Fig. 3 is a detail cross-section on the line $x$ $x$ of Fig. 1, seen in direction of arrow 1.

Upon the end of a bar, A, rigid with the casing B and the handle C, is formed, at about right angles to the bar, a fork-shaped hook, $a$, its two prongs being curved or bent back a little toward the handle, and the diameter of the bar adjoining the hook $a$ being reduced a little and cut away in a circular form, so that the button may be lodged in the said curved portion, while the eye of the button is between the two prongs of the fork, as in Fig. 2.

Upon the bar A is fitted to slide a push-block, $b$, which is cut away at an incline at $b'$, so as not to engage the shoe-flap, and has at the side of the bar A, opposite to the prongs $a$, a curved projection or toe, $c$, the point of the toe being about in line with the incline $b'$, but the inner portion being concave or cut away slightly at $c'$, so as to better turn down the edge of the flap from the button.

To the slide-block $b$ is secured at $d$ the outer end of a bar, D, which is fitted to slide in the casing B, and has upon its inner end a series of teeth to form a rack, $d'$, in which meshes the teeth of a cog-segment, E, pivoted at $e$ in the casing B. A spiral or other spring, $f$, attached with one end to the bar D and with the other to the casing B, tends normally to keep the block $b$ in the position shown in Fig. 1, so as to always be ready for operation. The slide of the block $b$ outward upon the bar A is accomplished by means of the said rack and segment by pressing the pivoted handle F toward the stop $s$ upon the fixed handle C, a curved lever, G, communicating motion from the pivoted handle to the said segment. The lever G is pivoted with one end at $g$ to the casing B, and the concave side of its other or curved end, I, engages a pin, $m$, attached to the side of the cog-segment E near the periphery of the latter. The handle E is pivoted at $h$ near to the edge of the casing B, and extends thence inward with a curved projection, H, the concave side of which engages a pin, $n$, fastened to the lever G at a suitable point between its curved end I and its fulcrum $g$. The compression of the handles (grasped both with one hand in the manner of holding a pair of pliers) oscillates the handle end H, the lever G, and the segment E in the direction of the arrows 2, 3, and 4, respectively, and moves the rack $d'$ D outward against the action of the spring $f$, thus sliding the block $b$ toward the hook $a$ of the bar A. On withdrawal of the pressure the spring returns the parts to their normal positions.

The construction would of course be simplified by making the handle F rigid with and movable upon the center of the segment E, but in that case the movement of the handle F required to effect the proper throw of the slide-block $b$ would have to be so large as to make the spread of the handles inconveniently great for the grasp of one hand; thence the interposition of the lever G, &c., as above described.

The manner of using the instrument will be clear with reference to Fig. 2. The bar A is pushed through the button-hole of the upper shoe-flap, K, and the corresponding button, M, of the lower flap, L, engaged by the hook $a$. The handles are then simply pressed together, which slides the block or presser $b$ down into the dotted position, and forces the flap K and its button-hole below the end of the bar A, underneath the hook $a$, and around the eye of the button, (as indicated by the dotted position K' of the flap K,) thus also making the hook free to be disengaged from the button M and ready for repeating the operation with the next button.

It is evident that the essential parts of the invention are the hooked bar A and the slide $b$. The parts by which the slide is moved may of course be varied according to taste and expedience.

Having thus described my invention, what I claim as new, and desire to secure by Letters Patent, is—

1. A button-hooker consisting of a bar, A, having end hook, $a$, and adapted to be entered through a button-hole to engage the corresponding button, in combination with a slide-block, $b$, adapted to push the button-hole flap off from the said bar when so entered, and its actuating means, substantially as described.

2. In a button-hooker, the combination of the bar A, having end hook, $a$, a frame part, B, rigidly secured to the said bar A, and having a fixed handle, C, and a movable handle, F, the block $b$, fitted to slide on the said bar and secured to a sliding rod, D, normally withdrawn from the said hook, and gear connecting the said rod and handle D F for projecting the said slide-block by compressing the said handles for the purpose of buttoning, in the manner set forth.

In testimony that I claim the foregoing as my invention I have signed my name, in presence of two witnesses, this 12th day of November, 1885.

GULDBRAND OLSEN RING.

Witnesses:
 KARL L. PRÖIT,
 J. B. KYLANDER.